UNITED STATES PATENT OFFICE.

OTTO H. KRAUSE, OF JERSEY CITY, NEW JERSEY.

PROCESS OF PURIFYING SACCHARINE LIQUIDS.

SPECIFICATION forming part of Letters Patent No. 303,376, dated August 12, 1884.

Application filed May 7, 1884. (No specimens.)

*To all whom it may concern:*

Be it known that I, OTTO H. KRAUSE, of Jersey City, New Jersey, have invented an Improved Process of Purifying Saccharine Liquids, of which the following is a specification.

This invention especially relates to a supplementary treatment of the impurities removed from saccharine liquids of low grades by the process described in Letters Patent of the United States No. 240,879, dated May 3, 1881, granted to Arno Behr, Otto H. Krause, and Henry E. Niese. The characteristic features of the process described in the said patent consist in diluting the sugar liquid to a density of about 15° Baumé, and treating it with lime, and filtering it at a temperature of from 110° to 120° Fahrenheit through bag-filters, and in subsequently neutralizing the filtered liquid, and repeating the filtration through bag-filters or presses at a higher temperature. As in all cases where sugar liquor is strained in this way, there is collected in the bags a mass of impurities and scum of a highly-viscous character, which greatly obstructs the filtering operation. It has therefore been the practice when such obstruction was observed to remove the remnants of sugar-liquor from the bags by pumping or otherwise, and to then force sweet water through the bags, and subsequently to wash the bags with water for the purpose of saving as much as possible of the sugar present in the impurities. I have found, however, that, notwithstanding the methods heretofore employed, a sensible proportion of such sugar has been lost, and it is the object of my present invention to more effectually separate the sugar from the impurities obtained by the filtration of sugar-liquor through filter-bags.

To that end my invention consists in removing the impurities from the filter-bags, and in diluting them with a quantity of water sufficient to form a thin solution of a density, say, from 2° to 4° Baumé, and in then adding lime to the solution until energetic precipitation takes place, which is ascertained by observing samples of the solution in test-vials. The quantity of lime ordinarily required is equal to from four to seven per cent. of the solid matter present in the solution.

As the quantity of lime required varies, it is desirable to test the solution, and to cease adding lime as soon as energetic precipitation is observed. When the proper quantity of lime has been added, the solution is immediately heated to a temperature of about 120° Fahrenheit, and run through filter-presses. By this means nearly all the sugar originally contained in the impurities is saved.

My process may be usefully employed in connection with the use of bag-filters for filtering sugar-liquids under all circumstances. The impurities retained in the bags always contain more or less sugar, nearly all of which can be saved by washing the bags, removing the impurities therefrom, and forming them into a solution of low density, and treating such solution with lime until energetic precipitation takes place, and heating it to about 120° Fahrenheit and running it through a filter-press.

I claim as my invention—

The herein-described process of extracting sugar from the impurities obtained by straining sugar-liquids through bag-filters, which consists in removing such impurities from the bags and diluting the impurities with sufficient water to make a thin solution, and in then adding to such solution sufficient lime to produce the effect of energetic precipitation, and in then heating the solution to a temperature of about 120° Fahrenheit and immediately running it through filter-presses.

O. H. KRAUSE.

Witnesses:
 H. E. NIESE,
 P. J. MURPHY.